US012619657B2

(12) United States Patent　　　　　(10) Patent No.: US 12,619,657 B2
Sugiura　　　　　　　　　　　　　　　(45) Date of Patent: May 5, 2026

(54) DISPLAY APPARATUS, DISPLAY METHOD, AND RECORDING MEDIUM WITH DISPLAY PROGRAM RECORDED THEREON FOR USER RECOGNITION OF A CONNECTED PERIPHERAL DEVICE

(71) Applicant: SHARP KABUSHIKI KAISHA, Sakai City (JP)

(72) Inventor: Kousuke Sugiura, Sakai City (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 351 days.

(21) Appl. No.: 18/518,378

(22) Filed: Nov. 22, 2023

(65) Prior Publication Data

US 2024/0202231 A1　　Jun. 20, 2024

(30) Foreign Application Priority Data

Dec. 20, 2022　(JP) ................................. 2022-202778

(51) Int. Cl.
| | |
|---|---|
| *G06F 16/58* | (2019.01) |
| *G06F 16/538* | (2019.01) |
| *G06F 16/54* | (2019.01) |
| *G06T 11/60* | (2006.01) |

(52) U.S. Cl.
CPC ............ *G06F 16/58* (2019.01); *G06F 16/538* (2019.01); *G06F 16/54* (2019.01); *G06T 11/60* (2013.01)

(58) Field of Classification Search
None
See application file for complete search history.

(56) References Cited

U.S. PATENT DOCUMENTS

2017/0048373 A1* 2/2017 Dees ................ H04N 21/41407

FOREIGN PATENT DOCUMENTS

JP　　　　2016164781 A　　9/2016

* cited by examiner

*Primary Examiner* — Lennin R Rodriguezgonzalez
(74) *Attorney, Agent, or Firm* — ScienBiziP, P.C.

(57)　　　　　ABSTRACT

A display apparatus includes: an acquisition processing unit that acquires identification information of a peripheral device connected to the display apparatus; a search processing unit that searches for an image corresponding to the peripheral device via a network, based on the identification information acquired by the acquisition processing unit; and a display processing unit that displays a device image corresponding to the peripheral device in the display apparatus in association with the identification information, based on the image searched for by the search processing unit.

9 Claims, 8 Drawing Sheets

| IMAGE ID | IMAGE |
|----------|-------|
| 000111 | |
| 000215 | |
| 000145 | |
| 000356 | |
| 000201 | |
| ⋮ | ⋮ |

DISPLAY APPARATUS, DISPLAY METHOD, AND RECORDING MEDIUM WITH DISPLAY PROGRAM RECORDED THEREON FOR USER RECOGNITION OF A CONNECTED PERIPHERAL DEVICE

INCORPORATION BY REFERENCE

This application is based upon and claims the benefit of priority from the corresponding Japanese Patent Application No. 2022-202778 filed on Dec. 20, 2022, the entire contents of which are incorporated herein by reference.

BACKGROUND

The present disclosure relates to a display apparatus, a display method, and a recording medium with a display program recorded thereon.

Conventionally, a system is known in which, on a setting screen for performing settings to devices (peripheral devices) such as a camera, a microphone, or a speaker used in a web meeting, the devices connected to an information processing apparatus (a display apparatus) are displayed in a selectable manner in a predetermined display order.

However, with the conventional technique, since the device information (the identification information), such as the model number of a device, is displayed on the setting screen with text characters, it is difficult for the user to intuitively recognize a device connected to the display apparatus.

SUMMARY

An object of the present disclosure is to provide a display apparatus, a display method, and a recording medium with a display program recorded thereon, which allow a user to easily recognize a peripheral device connected to a display apparatus.

A display apparatus according to an embodiment of the present disclosure includes an acquisition processing unit, a search processing unit, and a display processing unit. The acquisition processing unit acquires identification information of a peripheral device connected to the display apparatus. The search processing unit searches for an image corresponding to the peripheral device via a network, based on the identification information acquired by the acquisition processing unit. The display processing unit displays a device image corresponding to the peripheral device in the display apparatus in association with the identification information, based on the image searched for by the search processing unit.

A display method according to an embodiment of the present disclosure is a method for causing one or a plurality of processors to execute: acquiring identification information of a peripheral device connected to a display apparatus; searching for an image corresponding to the peripheral device via a network, based on the identification information; and displaying a device image corresponding to the peripheral device in the display apparatus in association with the identification information, based on the image searched for.

A recording medium according to another embodiment of the present disclosure is a recording medium with a program recorded thereon, and the program causes one or a plurality of processors to execute: acquiring identification information of a peripheral device connected to a display apparatus; searching for an image corresponding to the peripheral device via a network, based on the identification information; and displaying a device image corresponding to the peripheral device in the display apparatus in association with the identification information, based on the image searched for.

According to the present disclosure, it is possible to provide a display apparatus, a display method, and a recording medium with a display program recorded thereon, which allow a user to easily recognize a peripheral device connected to a display apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of images recorded in a data server according to an embodiment of the present disclosure.

DETAILED DESCRIPTION

Hereinafter, embodiments of the present disclosure are explained with reference to the accompanying drawings. Note that the embodiments below are each a concrete example of the present disclosure, and are not intended to limit the technical scope of the present disclosure.

The display system according to the present disclosure can be applied to, for example, a case where each of multiple users uses a user terminal and devices such as a camera, a microphone, and a speaker to perform an online meeting (a web meeting or the like). The camera, microphone, and speaker are peripheral devices connected to or built into a user terminal. Each user can start a predetermined application (such as a meeting application) on his or her own user terminal, set a camera, a microphone, and a speaker, and have a conversation by transmitting and receiving video and audio.

Display System 10

Figure 1:
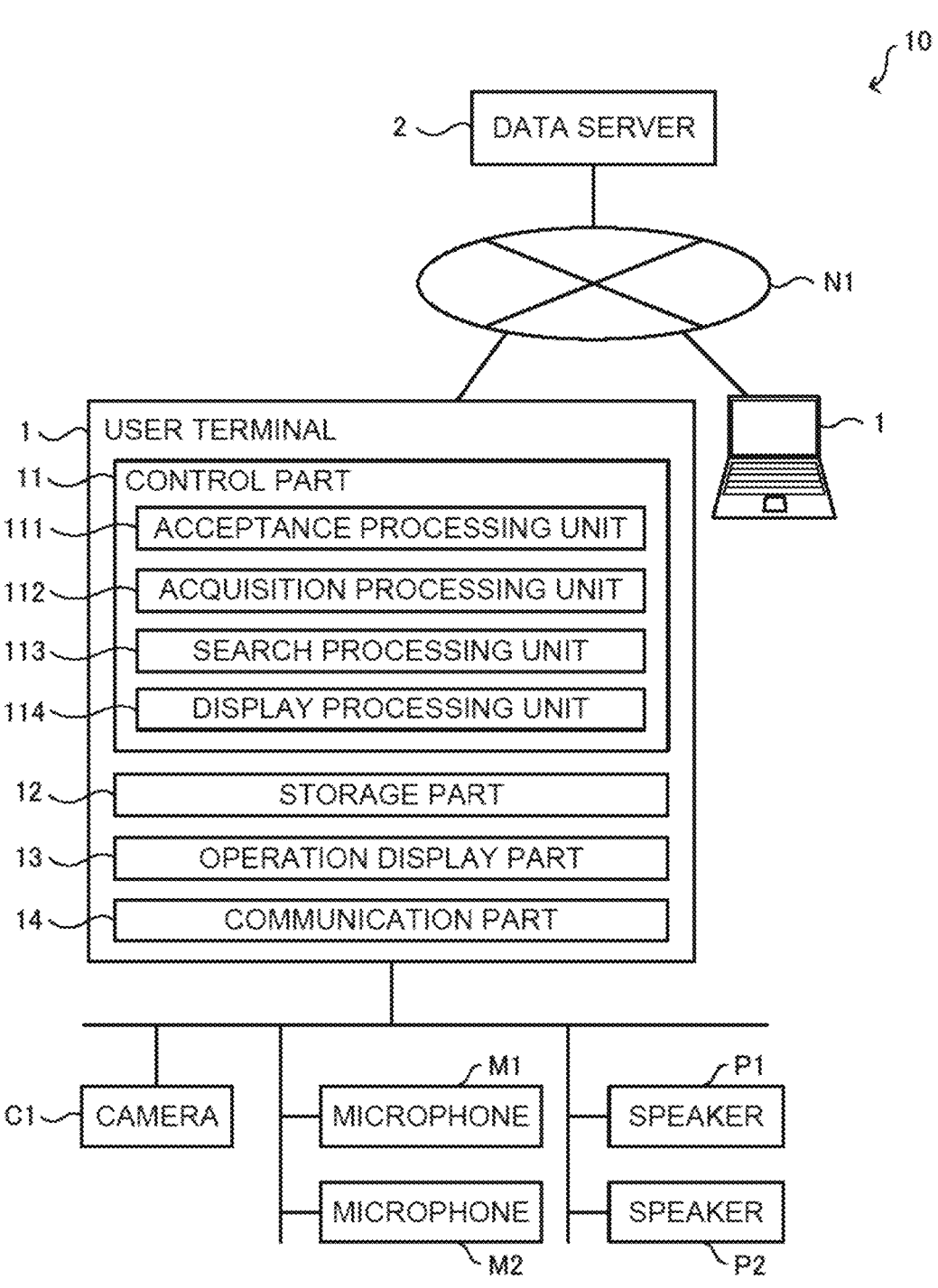
FIG. 1 is a diagram illustrating a configuration of a display system according to an embodiment of the present disclosure.

FIG. 1 is a diagram illustrating a configuration of the display system 10 according to an embodiment of the present disclosure. The display system 10 includes the user terminal 1, the data server 2, and peripheral devices (the camera C1, the microphone M1 and the microphone M2, the speaker P1 and the speaker P2, etc.). The display system 10 includes one or a plurality of the user terminal 1. Further, the peripheral devices may be connected to the user terminal 1 in a wired or wireless manner, or may be built into the user terminal 1. In the example illustrated in FIG. 1, for example, the camera C1 is connected to the user terminal 1 in a wired manner, the microphone M1 and the speaker in P1 are built into the user terminal 1, and the microphone M2 and the speaker P2 are connected to the user terminal 1 in a wired manner.

The data server 2 is a storage apparatus that stores various types of information. The user terminal 1 and the data server 2 can communicate via the communication network N1 which may be the Internet, a LAN, a WAN, a public telephone line, or the like.

The camera C1 is a digital camera that captures an image of a subject and outputs the image as digital image data. The image data captured by the camera C1 is transmitted to the user terminal 1. For example, the camera C1 is installed in the user terminal 1 or around the user terminal 1, and captures a predetermined area including the user who uses the user terminal 1.

The microphone M1 and the microphone M2 collect the sound of the spoken audio of the user of the user terminal 1 and transmit the audio data to the user terminal 1. The speaker P1 and the speaker P2 output (emit the sound of) the audio data transmitted from other user terminals 1.

The display system 10 may include a meeting server that executes a meeting application for an online meeting. The meeting server manages meeting information. Each user terminal 1 starts a meeting application and transmits and receives video and audio via the meeting server. Thus, multiple users can hold an online meeting.

Figure 2:
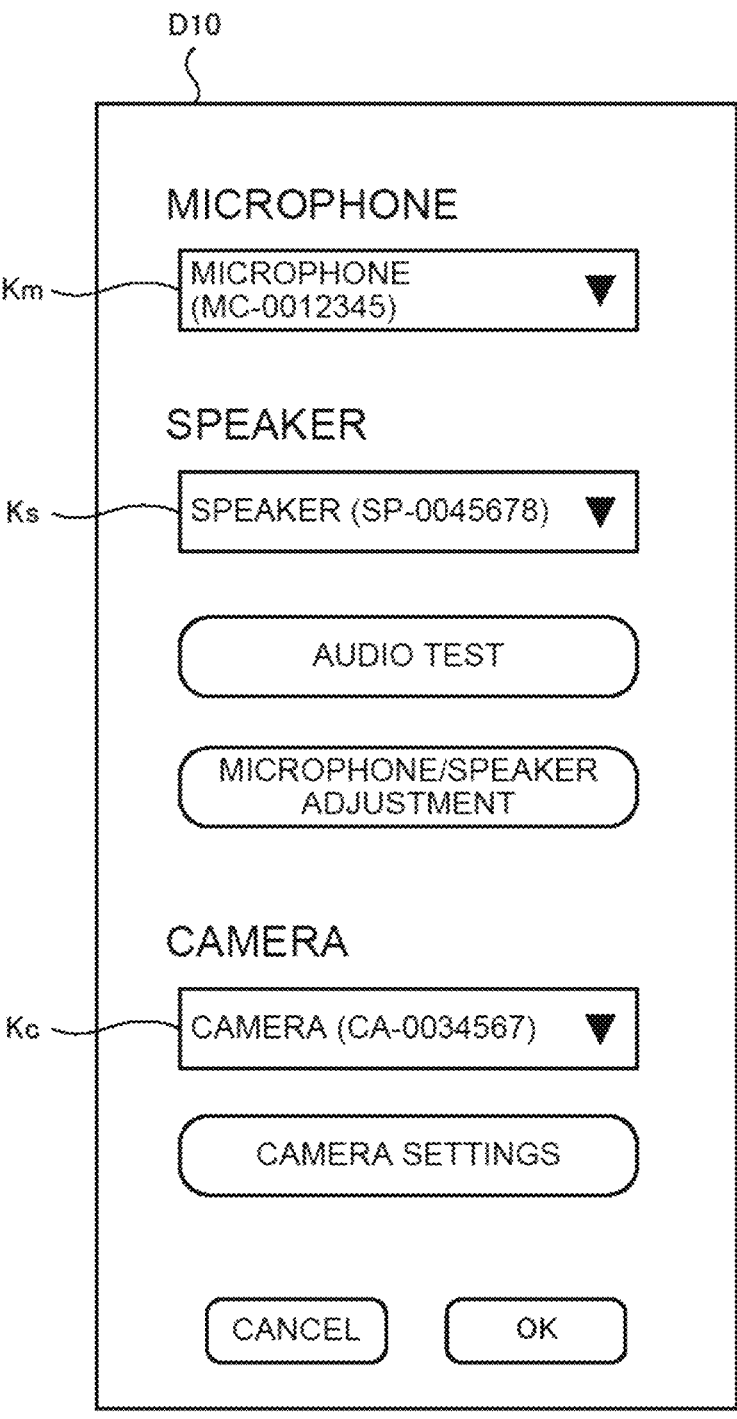
FIG. 2 is a diagram illustrating an example of a conventional setting screen displayed on a user terminal.

Here, as an online meeting is held, each user performs an operation for setting a peripheral device to be used. For example, a user starts the meeting application and performs an operation for setting a microphone, a speaker, and a camera on the setting screen D10. In FIG. 2, an example of the conventional setting screen D10 is illustrated. The setting screen D10 illustrated in FIG. 2 includes the microphone setting field Km for setting a microphone, the speaker setting field Ks for setting a speaker, and the camera setting field Kc for setting a camera. The user presses (clicks) the microphone setting field Km on the setting screen D10 to select the microphone to be used from one or more microphones displayed in the microphone list. Further, the user presses (clicks) the speaker setting field Ks on the setting screen D10 to select the speaker to be used from one or more speakers displayed in the speaker list. Further, the user presses (clicks) the camera setting field Kc on the setting screen D10 to select the camera to be used from one or more cameras displayed in the camera list.

Since the device information (the identification information) such as the model number of a device is displayed in text characters on the conventional setting screen D10, it is difficult for a user to intuitively recognize the device the user wants to use. For this reason, for example, in a case where multiple microphones are connected to the user terminal 1, there is a concern that the user cannot recognize the model number of the microphone the user wants to use, and may perform an erroneous setting. In contrast to this, as described below, the user terminal 1 according to the present embodiment has a configuration capable of making the user easily recognize the peripheral devices connected to the user terminal 1.

User Terminal 1

As illustrated in FIG. 1, the user terminal 1 is an information processing apparatus including the control part 11, the storage part 12, the operation display part 13, the communication part 14, etc. The user terminal 1 is, for example, a personal computer, a smartphone, or the like. The user terminal 1 is an example of the display apparatus of the present disclosure.

The communication part 14 is a communication part for executing data communication according to a predetermined communication protocol between the user terminal 1 and peripheral devices such as the camera C1, the microphone M1, the microphone M2, the speaker P1, and the speaker P2 in a wired or wireless manner. Further, the communication part 14 is a communication interface for connecting the user terminal 1 to the communication network N1 (for example, the Internet) in a wired or wireless manner and executing data communication according to a predetermined communication protocol with external devices such as the data server 2 via the communication network N1.

The operation display part 13 is a user interface including a display part, such as a liquid crystal display or an organic EL display, that displays various kinds of information, and an operation part, such as a mouse, a keyboard, or a touch panel, that accepts an operation.

The storage part 12 is a non-volatile storage part such as a hard disk drive (HDD), a solid state drive (SSD), a flash memory, or the like that stores various types of information. Specifically, information regarding peripheral devices such as the camera C1, the microphone M1, the microphone M2, the speaker P1, and the speaker P2 is stored on the storage part 12.

Further, the storage part 12 stores a control program such as a device setting program for causing the control part 11 to execute a device setting process (see FIG. 8), which is described hereinafter. For example, the above-mentioned device setting program may be non-temporarily recorded on a computer-readable recording medium such as a CD or a DVD, and read by a reading apparatus (not illustrated in the drawings) such as a CD drive or a DVD drive installed in the user terminal 1, so as to be stored on the storage part 12. The above-mentioned device setting program is an example of the display program according to the present disclosure.

The control part 11 has control devices such as a CPU, ROM, and RAM. The CPU is a processor that executes various types of arithmetic processing. The ROM is a non-volatile storage part in which control programs such as a BIOS and an OS for causing the CPU to execute various kinds of arithmetic processing are stored in advance. The RAM is a volatile or non-volatile storage part that stores various kinds of information, and is used as a temporary storage memory (a work region) for various kinds of processing executed by the CPU. Furthermore, the control part 11 controls the user terminal 1 by causing the CPU to execute various types of control programs stored in advance on the ROM or the storage part 12. Specifically, as illustrated in FIG. 1, the control part 11 includes various processing units such as the acceptance processing unit 111, the acquisition processing unit 112, the search processing unit 113, and the display processing unit 114. Note that the control part 11 functions as the various types of processing units by having the CPU execute various kinds of processing according to the control programs. Further, a part or all of the processing units may be configured with an electronic circuit. Note that the control programs may be programs for causing multiple processors to function as the processing units.

The acceptance processing unit 111 accepts various operations from the user. For example, the acceptance processing unit 111 accepts a setting operation of a peripheral device to be used in an online meeting from the user.

The acquisition processing unit 112 acquires the identification information (a model number, a device number, a product number, or the like) of a peripheral device connected to the user terminal 1. For example, in a case where the camera C1, the microphone M1, the microphone M2, the speaker P1, and the speaker P2 are connected to the user terminal 1, the acquisition processing unit 112 acquires the identification information of the camera C1, the identification information of the microphone M1, the identification information of the microphone M2, the identification information of the speaker P1, and the identification information of the speaker P2 each.

The search processing unit 113 searches, based on the identification information of a peripheral device acquired by the acquisition processing unit 112, for an image corresponding to the peripheral device via a network. Specifically, the search processing unit 113 transmits a search request including the device information of a peripheral device to the data server 2 via the Internet (the communication network N1). Here, the search processing unit 113 transmits a search request including the identification information of the camera C1, the identification information of the microphone M1, the identification information of the microphone M2, the identification information of the speaker P1, and the identification information of the speaker P2 to the data server 2.

The data server 2 searches for an image corresponding to the search request from among images stored on the storage part (the database DB). In FIG. 3, an example of the database DB is illustrated. As illustrated in FIG. 3, images of various peripheral devices (device images) are stored in the database DB. Note that the device images may be photographs (still images), videos, or illustrations. The data server 2 searches for a camera image matching or similar to the identification information of the camera C1, a microphone image matching or similar to the identification information of the microphone M1, a microphone image matching or similar to the identification information of the microphone M2, a speaker image matching or similar to the identification information of the speaker P1, and a speaker image matching or similar to the identification information of the speaker P2. The data server 2 transmits search results (device images) to the user terminal 1. Upon acquiring the device images from the data server 2, the search processing unit 113 stores the device images in the storage part 12.

The search processing unit 113 identifies the type of peripheral device based on the identification information of the peripheral device, and searches for an image of the identified type. Specifically, the search processing unit 113 transmits a search request for an image of a camera to the data server 2 in a case where the peripheral device is a camera, transmits a search request for an image of a microphone to the data server 2 in a case where the peripheral device is a microphone, and transmits a search request for an image of a speaker to the data server 2 in a case where the peripheral device is a speaker.

The display processing unit 114 displays a device image corresponding to the peripheral device in association with the identification information based on the image searched for by the search processing unit 113.

Figure 4:
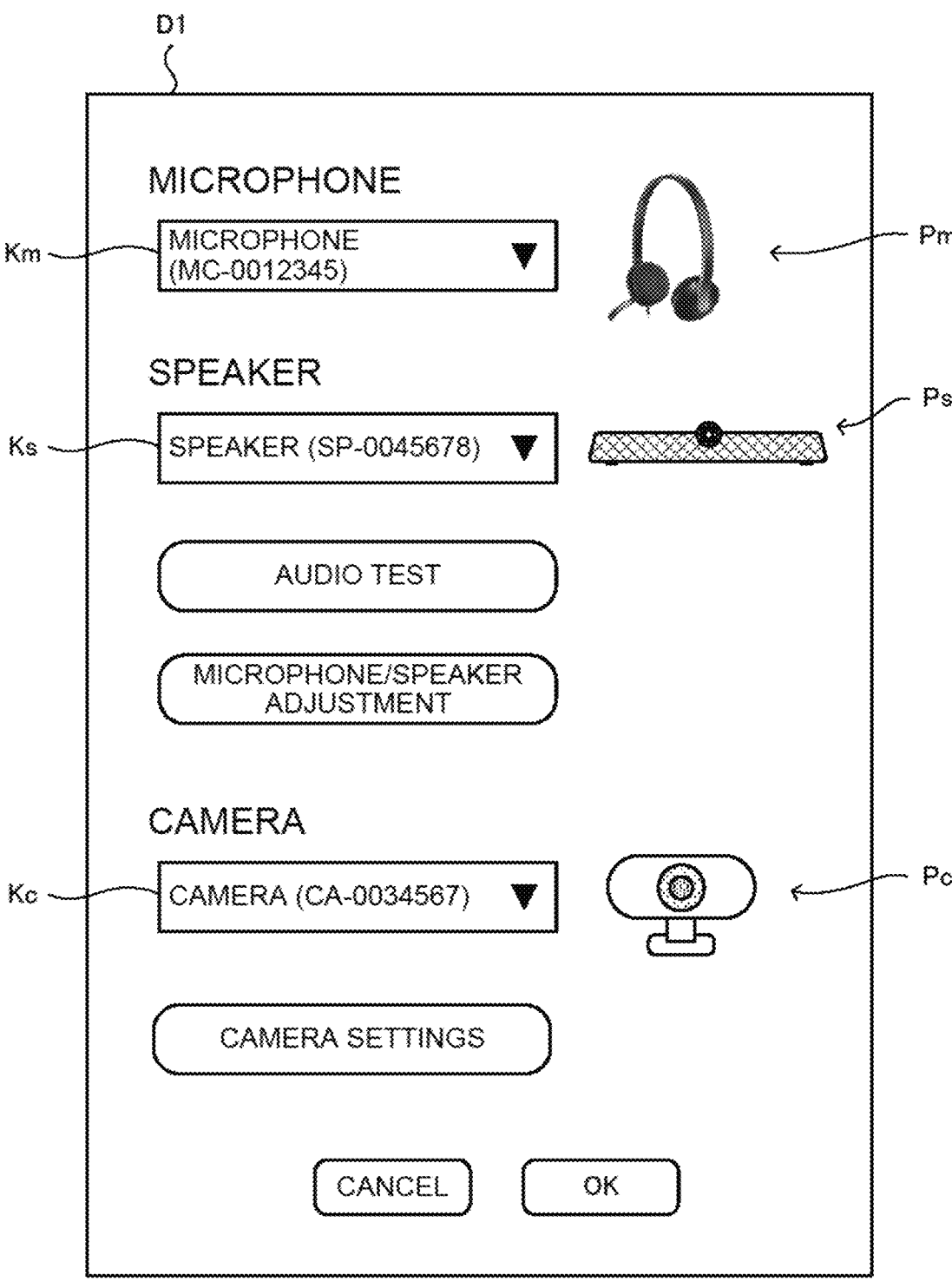
FIG. 4 is a diagram illustrating an example of a setting screen displayed on the user terminal according to an embodiment of the present disclosure.

For example, as illustrated in FIG. 4, the display processing unit 114 displays the microphone image Pm corresponding to the identification information of the microphone displayed in the microphone setting field Km on the setting screen D1 in association with the identification information. Further, the display processing unit 114 displays the speaker image Ps corresponding to the identification information of the speaker displayed in the speaker setting field Ks on the setting screen D1 in association with the identification information. Further, the display processing unit 114 displays the camera image Pc corresponding to the identification information of the camera displayed in the camera setting field Kc on the setting screen D1 in association with the identification information.

Figure 5:
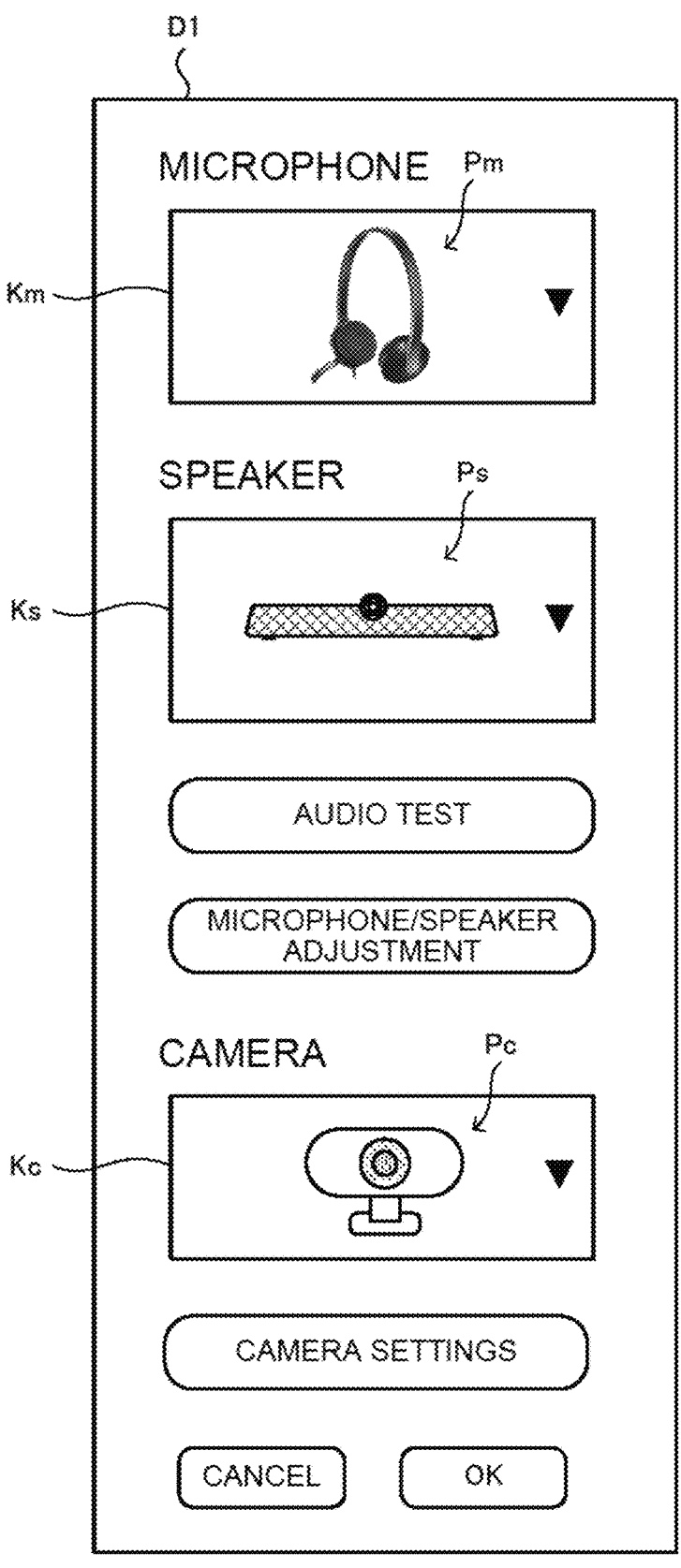
FIG. 5 is a diagram illustrating an example of a setting screen displayed on the user terminal according to an embodiment of the present disclosure.

Additionally, as illustrated in FIG. 4, the display processing unit 114 displays each device image side by side with the identification information. Alternatively, as illustrated in FIG. 5, the display processing unit 114 may display each device image instead of the identification information. In the example illustrated in FIG. 5, for example, as the user presses the microphone setting field Km, the display processing unit 114 displays a list of the microphone image Pm corresponding to the identification information of the microphone M1 and the microphone image Pm corresponding to the identification information of the microphone M2. The user can select the microphone image Pm of the microphone the user wants to use from the multiple microphone images Pm displayed in the list.

Figure 6:
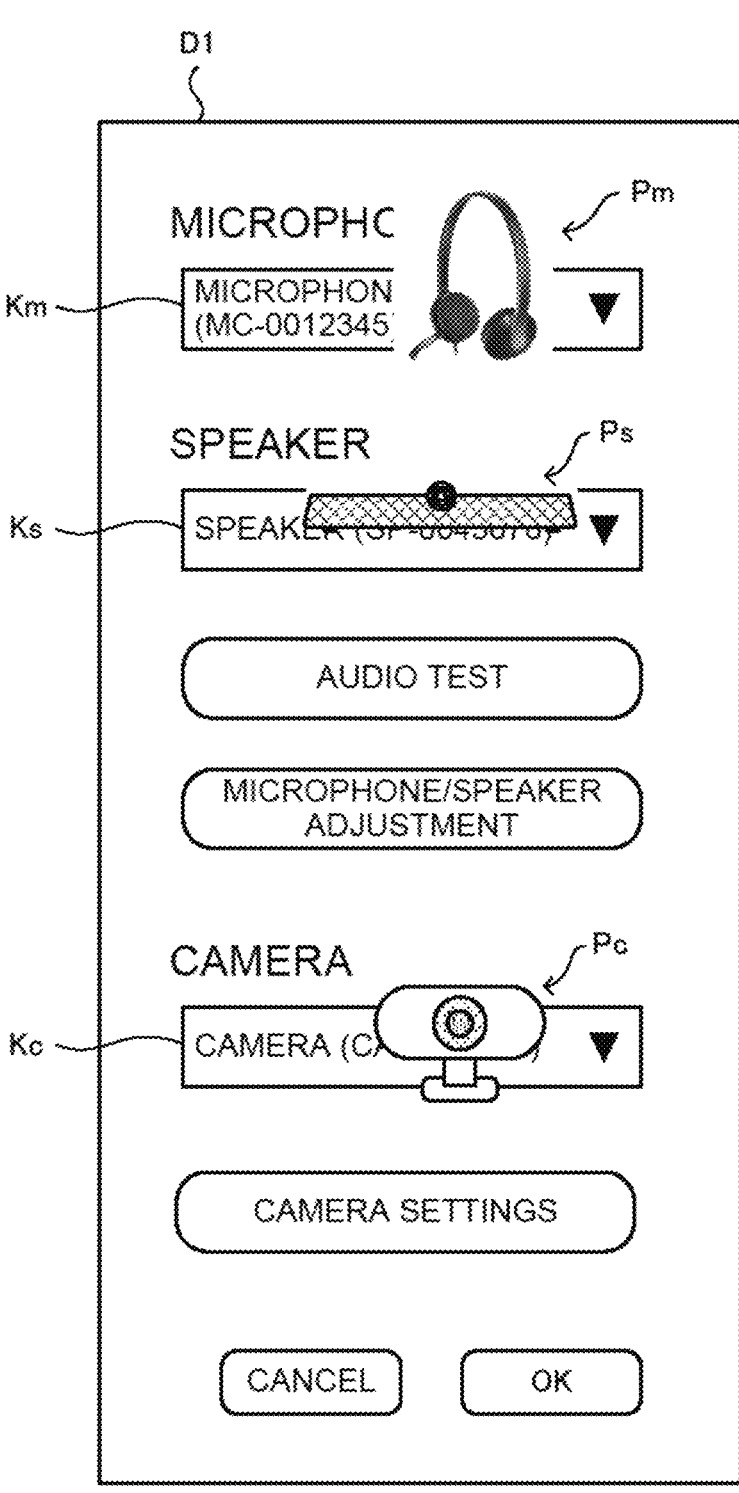
FIG. 6 is a diagram illustrating an example of a setting screen displayed on the user terminal according to an embodiment of the present disclosure.

Alternatively, as illustrated in FIG. 6, the display processing unit 114 may display each device image superimposed on the identification information.

Figure 7:
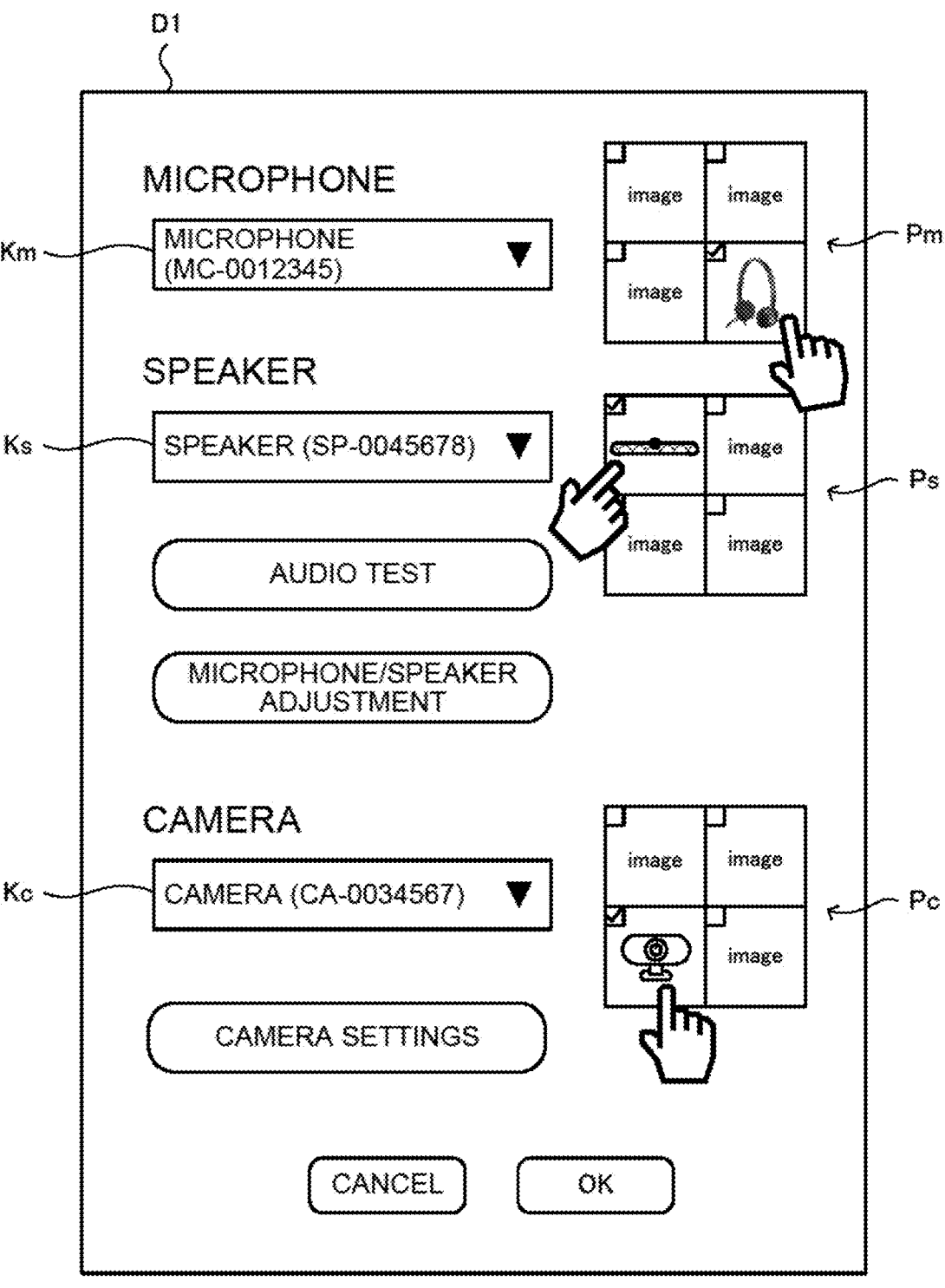
FIG. 7 is a diagram illustrating an example of a setting screen displayed on the user terminal according to an embodiment of the present disclosure.

As another embodiment, the search processing unit 113 may search for a predetermined number of top ranked device images which have a high degree of matching with a peripheral device based on the identification information of peripheral devices, and the display processing unit 114 may display a list of the predetermined number of device images in association with the identification information. For example, the data server 2 searches for the top ranked four microphone images which have a high degree of matching (similarity) with the identification information of the microphones, and the search processing unit 113 acquires the four microphone images. For example, as illustrated in FIG. 7, the display processing unit 114 displays a list of the four microphone images Pm found in the search on the setting screen D1. The user selects the microphone image Pm corresponding to the microphone to be used from among the four microphone images Pm on the setting screen D1.

Similarly, on the setting screen D1 illustrated in FIG. 7, the display processing unit 114 displays the four speaker images Ps found in the search and the four camera images Pc found in the search each in a list. On the setting screen D1, the user selects the speaker image Ps corresponding to the speaker to be used from among the four speaker images Ps, and selects the camera image Pc corresponding to the camera to be used from among the four camera images Pc.

The display processing unit 114 displays the device image selected by the user from among the predetermined number of device images displayed in a list in association with the identification information of the peripheral device. Note that the display processing unit 114 may display the identification information corresponding to the device image selected by the user in each setting field. For example, in a case where the user selects the lower right microphone image Pm on the setting screen D1 illustrated in FIG. 7, the display processing unit 114 displays the identification information of the microphone corresponding to the selected microphone image Pm in the microphone setting field Km. Alternatively, the display processing unit 114 may display information (a check box in FIG. 7) capable of identifying the device image selected by the user from a displayed list.

Note that the display processing unit 114 may display only the identification information of peripheral devices on the setting screen D1 before device images are searched for (see FIG. 2), and after device images are found in the search, the display processing unit 114 may display the device images side by side with the identification information (see FIG. 4), may display the device images instead of the identification information (see FIG. 5), may display the device images superimposed on the identification information (see FIG. 6), or may display a list of the device images (see FIG. 7).

In a case where the user selects the peripheral devices as described above, the control part 11 ends the setting process of the peripheral devices and starts the online meeting. The user can perform an operation to change a peripheral device even after the online meeting has started (during the online meeting).

Device Setting Process

Figure 8:
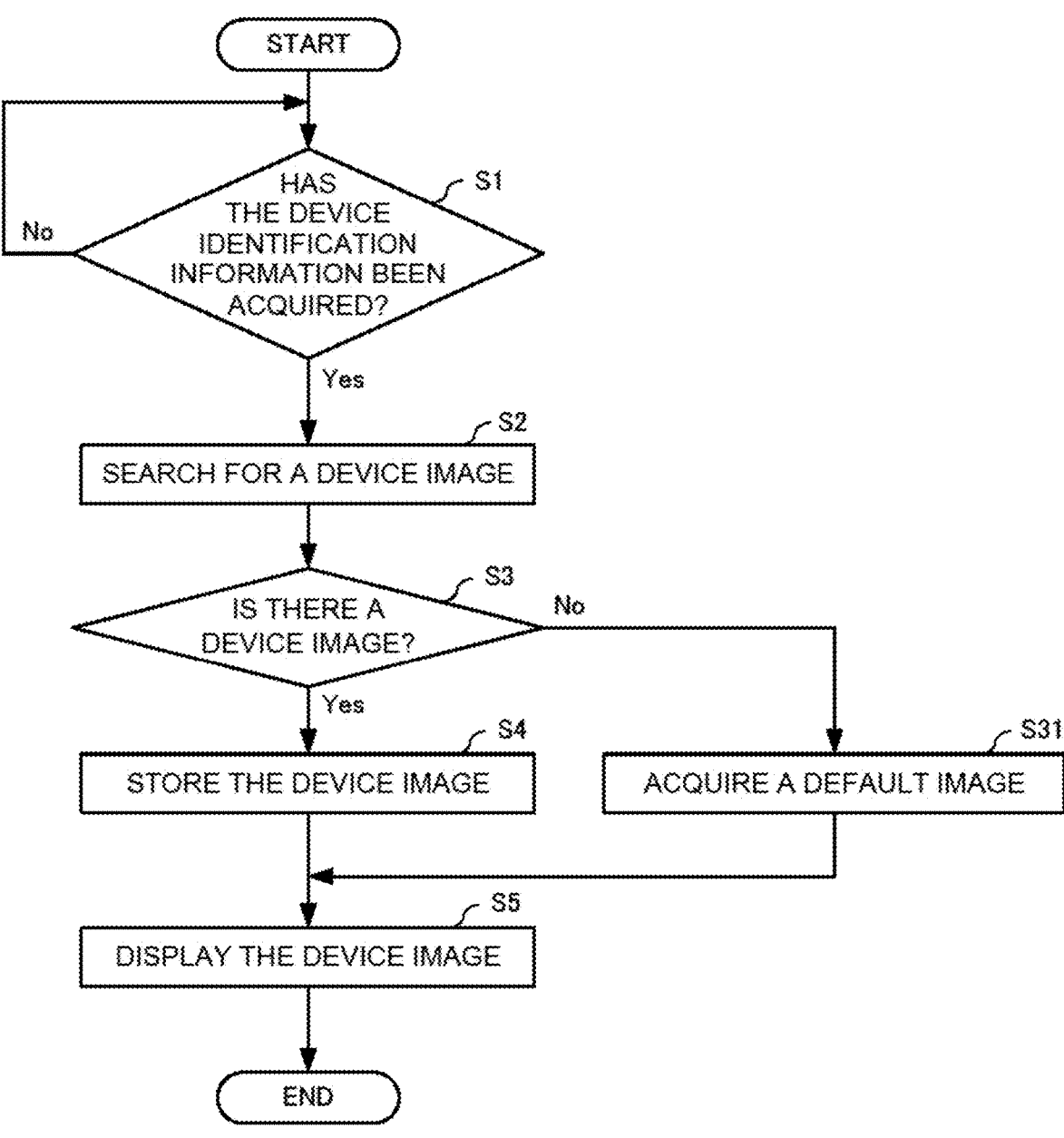
FIG. 8 is a flowchart for explaining an example of a procedure of a device setting process executed in the user terminal according to an embodiment of the present disclosure.

Hereinafter, with reference to FIG. 8, an explanation is given of an example of the procedure for the device setting process executed by the control part 11 of the user terminal 1.

Note that the present disclosure can be regarded as a disclosure of a device setting method (the display method of the present disclosure) for executing one or multiple steps included in the device setting process. In addition, one or multiple steps included in the device setting process explained herein may be omitted as appropriate. Further, the order of execution of each step in the device setting process may differ to the extent that a similar functional effect is produced. Furthermore, although the case where the control part 11 executes each step in the device setting process is taken as an example herein for the explanation, it is also possible as another embodiment that each step in the device setting process is distributed for one or more processors for execution.

First, in step S1, the control part 11 determines whether or not the identification information (the model number, the device number, the product number, or the like) of a peripheral device has been acquired. For example, if the control part 11 recognizes the camera C1, the microphone M1, the microphone M2, the speaker P1, and the speaker P2 connected to the user terminal 1, the control part 11 acquires the identification information of each peripheral device. Further, for example, in a case where the user selects the identification information of a peripheral device on the setting screen D1 (see FIG. 4, etc.), the control part 11 may acquire the identification information of the selected peripheral device. Upon acquiring the identification information of a peripheral device (S1: Yes), the control part 11 proceeds the processing to step S2. The control part 11 waits until the identification information of a peripheral device is acquired (S1: No).

In step S2, the control part 11 searches for a device image of a peripheral device. The control part 11 searches for a device image corresponding to the identification information of a peripheral device. For example, the control part 11 transmits a search request including the device information of the peripheral device to the data server 2 via the Internet (the communication network N1). Specifically, the search processing unit 113 transmits a search request including the identification information of the camera C1, the identification information of the microphone M1, the identification information of the microphone M2, the identification information of the speaker P1, and the identification information of the speaker P2 to the data server 2. The data server 2 searches for one or more device images that match or are similar to the identification information of each peripheral device and transmits the search result (device images) to the user terminal 1.

In step S3, the control part 11 determines whether or not there is a device image. If a device image matching the identification information of the peripheral device exists (S3: Yes), the control part 11 proceeds the processing to step S4. On the other hand, if no device image matching the identification information of the peripheral device exists (S3: No), the control part 11 proceeds the processing to step S31.

In step S4, the control part 11 stores the device image found in the search in the storage part 12. For example, the control part 11 acquires one or more device images matching the identification information of a peripheral device from the data server 2 and stores the device images in the storage part 12. After step S4, the control part 11 proceeds the processing to step S5.

On the other hand, in step S31, the control part 11 acquires a default image corresponding to the device information from a device image (a default image) stored in advance on the storage part 12 of the user terminal 1. For example, the default image may be stored on the storage part 12 once a peripheral device is connected to the user terminal 1 and installed. After step S31, the control part 11 proceeds the processing to step S5. In this way, in a case where an image corresponding to the peripheral device cannot be found in the search process via the network, the control part 11 displays a default image registered in advance in the user terminal 1 as the device image in association with the identification information. The default image is an example of a registered image of the present disclosure.

In step S5, the control part 11 displays the device image corresponding to the identification information of the peripheral device on the setting screen D1.

For example, as illustrated in FIG. 4, the control part 11 displays the microphone image Pm corresponding to the identification information of the microphone displayed in the microphone setting field Km on the setting screen D1 in association with the identification information. Further, the control part 11 displays the speaker image Ps corresponding to the identification information of the speaker displayed in the speaker setting field Ks on the setting screen D1 in association with the identification information. Further, the control part 11 displays the camera image Pc corresponding to the identification information of the camera displayed in the camera setting field Kc on the setting screen D1 in association with the identification information.

In addition, the control part 11 may display each device image side by side with the identification information as illustrated in FIG. 4, may display each device image instead of the identification information as illustrated in FIG. 5, or may display each device image superimposed on the identification information as illustrated in FIG. 6.

Further, as illustrated in FIG. 7, the control part 11 may display a list of a predetermined number of top ranked device images which have a high degree of matching with a peripheral device in association with the identification information. Further, in the example illustrated in FIG. 7, the control part 11 displays multiple device images displayed in a list so as to be selectable by the user.

Note that, in a case where there is a device image in the search process (S3: Yes), the control part 11 displays the device image acquired from the data server 2 on the setting screen D1, and if no device image exists in the search process (S3: No), the control part 11 displays a default image stored in advance in the storage part 12 on the setting screen D1.

The user selects a peripheral device to be used while checking the device images on the setting screen D1. The control part 11 sets the selected peripheral device and starts the online meeting.

Each user terminal 1 executes the device setting process described above simultaneously before starting the online meeting.

As explained above, the user terminal 1 according to the present embodiment acquires the identification information of a peripheral device connected to the user terminal 1, and searches for an image corresponding to the peripheral device via a network based on the acquired identification information. Then, the user terminal 1 displays the device image corresponding to the peripheral device in association with the identification information based on the image found in the search in the user terminal 1.

For example, in a case where the user terminal 1 finds one image in a search corresponding to the identification information of a peripheral device, the user terminal 1 displays the image as the device image corresponding to the peripheral device. In addition, for example, in a case where the user terminal 1 finds multiple images in a search corresponding to the identification information of a peripheral device, the user terminal 1 displays an image matching or most similar to the peripheral device as the device image corresponding to the peripheral device. In addition, the display processing unit 114 may display the multiple images so as to be selectable by the user.

According to the above-described configuration, since the device image corresponding to the peripheral device is displayed on the setting screen D1, the user can intuitively recognize the peripheral device usable in the user terminal 1. Therefore, the user can appropriately select a peripheral device that the user wants to use. That is, the user terminal 1 of the present disclosure can allow the user to easily recognize the peripheral device connected to the user terminal 1.

The present disclosure is not limited to the above-described embodiment. For example, the search processing unit 113 may search for an image corresponding to a peripheral device based on the identification information of the peripheral device and the usage status of the peripheral device. For example, in a case where the user holds an online meeting, the search processing unit 113 searches the database DB for an image suitable for the online meeting. For example, in a case where the user holds a private online meeting, the search processing unit 113 searches the database DB for an image suitable for private use. In this way, the device image corresponding to the usage state can be displayed on the setting screen D1.

As another embodiment, the control part 11 may display a device image on the setting screen D1 based on the setting information of the peripheral device set in the past. Accordingly, it is possible to prevent the search process from being executed each time a peripheral device is set.

In addition, as another embodiment, the acceptance processing unit 111 may accept an operation to select whether or not to display a device image on the setting screen D1 from the user. If the acceptance processing unit 111 accepts an instruction to display the device image from the user, the display processing unit 114 displays the device image in association with the identification information. For example, the user performs a screen setting on the setting screen D1 so that the device image is displayed on the setting screen D1 in a case where the peripheral device to be used cannot be identified only by the identification information of the peripheral device. Further, the user sets the device image to non-display in a case where the peripheral device can be identified only by the identification information. If the user sets to display the device image, the display processing unit 114 displays the device image on the setting screen D1. Accordingly, since the device image can be displayed only in a case where the user desires such, it is possible to prevent the inconvenience in uniformly displaying the device images.

In addition, the present disclosure may be configured with the user terminal 1 alone or may be configured with the control part 11 (the control device) of the user terminal 1 alone.

Supplementary Notes of the Disclosure

Hereinafter, a summary of the disclosure extracted from the above-described embodiments is described as supplementary notes. Note that each configuration and processing function explained in the supplementary notes below may be selected, omitted, and combined as appropriate.

Supplementary Note 1

A display apparatus comprising:

an acquisition processing circuit that acquires identification information of a peripheral device connected to a user terminal;

a search processing circuit that searches for an image corresponding to the peripheral device via a network, based on the identification information acquired by the acquisition processing circuit; and a display processing circuit that displays a device image corresponding to the peripheral device in the user terminal in association with the identification information, based on the image searched for by the search processing circuit.

Supplementary Note 2

The display apparatus according to Supplementary Note 1, wherein the display processing circuit displays the identification information before searching for the image, and displays the device image side by side with the identification information or displays the device image instead of the identification information after searching for the image.

Supplementary Note 3

The display apparatus according to Supplementary Note 1 or 2, wherein the search processing circuit searches for a predetermined number of the images which are top ranked with a high degree of matching with the peripheral device based on the identification information and, the display processing circuit displays a list of the predetermined number of the images as the device image in association with the identification information.

Supplementary Note 4

The display apparatus according to Supplementary Note 3,
  wherein the display processing circuit displays the image selected by a user out of the predetermined number of the images displayed in the list in association with the identification information.

Supplementary Note 5

The display apparatus according to any one of Supplementary Notes 1 to 4,
  wherein the search processing circuit identifies a type of the peripheral device based on the identification information, and searches for an image of the identified type.

Supplementary Note 6

The display apparatus according to any one of Supplementary Notes 1 to 5,
  wherein the search processing circuit searches for the image corresponding to the peripheral device based on the identification information and a usage status of the peripheral device.

Supplementary Note 7

The display apparatus according to any one of Supplementary Notes 1 to 6,
  wherein, in a case where the image corresponding to the peripheral device cannot be found by the search processing circuit in a process of the searching via the network, the display processing circuit displays a registered image registered in advance in the user terminal as the device image in association with the identification information.

Supplementary Note 8

The display apparatus according to any one of Supplementary Notes 1 to 7, further comprising an acceptance processing circuit that accepts an operation to select whether or not to display the device image from a user,
  wherein the display processing circuit displays the device image in association with the identification information in a case where an instruction from the user to display the device image is accepted by the acceptance processing circuit.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. A display apparatus comprising:
  one or more processors:
    acquiring identification information of a peripheral device connected to the display apparatus;
    searching, based on the identification information, for an image corresponding to the peripheral device via a network;
    displaying, based on the image searched for, a device image in the display apparatus, the device image corresponding to the peripheral device and associated with the identification information;
    searching, based on the identification information, for a predetermined number of images that are top ranked with a high degree of matching with the peripheral device; and
    displaying a list of the predetermined number of the images as the device image associated with the identification information.
2. The display apparatus according to claim 1, wherein the one or more processors further:
  display the identification information before searching for the image, and
  display the device image side by side with the identification information or display the device image instead of the identification information after searching for the image.
3. The display apparatus according to claim 1,
  wherein the one or more processors further display, when a user selects a first image out of the predetermined number of the images displayed in the list, the first image in place of the predetermined number of the images in association with the identification information.
4. The display apparatus according to claim 1,
  wherein the one or more processors identify a type of the peripheral device based on the identification information, and search for an image of the identified type.
5. The display apparatus according to claim 1,
  wherein the one or more processors search for the image corresponding to the peripheral device based on the identification information and a usage status of the peripheral device.
6. The display apparatus according to claim 1, wherein the one or more processors further display a registered image, registered in advance in the display apparatus, as the device image associated with the identification information in a case that the image corresponding to the peripheral device is not found in a process of the searching via the network.
7. The display apparatus according to claim 1,
  wherein the one or more processors accept an operation to select whether to display the device image from a user, and display the device image associated with the identification information in a case that an instruction from the user to display the device image is accepted.
8. A display apparatus comprising:
  one or more processors:
    acquiring identification information of a peripheral device connected to the display apparatus;
    searching, based on the identification information, for an image corresponding to the peripheral device via a network;
    displaying, based on the image searched for, a device image in the display apparatus, the device image corresponding to the peripheral device and associated with the identification information; and
    displaying a registered image, registered in advance in the display apparatus, as the device image associated with the identification information in a case that the image corresponding to the peripheral device is not found in a process of the searching via the network.
9. A display apparatus comprising:
  one or more processors:
    acquiring identification information of a peripheral device connected to the display apparatus;

searching, based on the identification information, for an image corresponding to the peripheral device via a network;

displaying, based on the image searched for, a device image in the display apparatus, the device image 5 corresponding to the peripheral device and associated with the identification information; and accepting an operation to select whether to display the device image from a user, and displaying the device image associated with the identification information 10 in a case that an instruction from the user to display the device image is accepted.

\* \* \* \* \*